(12) United States Patent
Brown et al.

(10) Patent No.: US 10,388,417 B2
(45) Date of Patent: Aug. 20, 2019

(54) ELECTRICAL PENETRATOR ASSEMBLY

(71) Applicant: TELEDYNE BROWN ENGINEERING, INC., Thousand Oaks, CA (US)

(72) Inventors: Paul Brown, Arab, AL (US); James Mitchell, Madison, AL (US); Remon Dihu, Huntsville, AL (US); Pat Kumar, Huntsville, AL (US)

(73) Assignee: TELEDYBE BROWN ENGINEERING, INC., Thousand Oaks, CA (US)

( * ) Notice: Subject to any disclaimer, the term of this patent is extended or adjusted under 35 U.S.C. 154(b) by 0 days.

(21) Appl. No.: 15/741,516

(22) PCT Filed: May 16, 2016

(86) PCT No.: PCT/US2016/032789
§ 371 (c)(1),
(2) Date: Jan. 3, 2018

(87) PCT Pub. No.: WO2017/200528
PCT Pub. Date: Nov. 23, 2017

(65) Prior Publication Data
US 2018/0197644 A1 Jul. 12, 2018

(51) Int. Cl.
| | |
|---|---|
| *H01R 13/533* | (2006.01) |
| *G21C 17/116* | (2006.01) |
| *H02G 3/22* | (2006.01) |
| *G21C 13/036* | (2006.01) |
| *G21C 13/028* | (2006.01) |

(Continued)

(52) U.S. Cl.
CPC ........ *G21C 17/116* (2013.01); *G21C 13/0285* (2013.01); *G21C 13/036* (2013.01); *H01R 13/10* (2013.01); *H01R 13/533* (2013.01); *H02G 3/22* (2013.01); *H01R 13/5219* (2013.01); *H01R 13/622* (2013.01); *Y02E 30/40* (2013.01)

(58) Field of Classification Search
None
See application file for complete search history.

(56) References Cited

U.S. PATENT DOCUMENTS

| | | | |
|---|---|---|---|
| 3,315,214 A | 4/1967 | Davis | |
| 3,576,517 A * | 4/1971 | Johnson | H01R 13/5221 174/77 R |

(Continued)

FOREIGN PATENT DOCUMENTS

| | | |
|---|---|---|
| DE | 1490332 A1 | 1/1969 |
| FR | 2961355 A1 | 12/2011 |

(Continued)

OTHER PUBLICATIONS

International Preliminary Report on Patentability for International Application No. PCT/US2016/032789 dated Nov. 20, 2018.

(Continued)

*Primary Examiner* — Tho D Ta
(74) *Attorney, Agent, or Firm* — K&L Gates LLP

(57) ABSTRACT

An apparatus configured to couple to an electrical penetration assembly is disclosed in which the apparatus comprises a connector comprising an inorganic seal to seal an inorganic flange and/or housing to an electrical penetration assembly.

16 Claims, 23 Drawing Sheets

(51) Int. Cl.
*H01R 13/10* (2006.01)
*H01R 13/622* (2006.01)
*H01R 13/52* (2006.01)

(56) References Cited

U.S. PATENT DOCUMENTS

| | | | | |
|---|---|---|---|---|
| 3,763,460 | A * | 10/1973 | Hatschek | H01R 13/533 |
| | | | | 439/277 |
| 3,816,641 | A * | 6/1974 | Iversen | H01R 13/523 |
| | | | | 174/75 C |
| 4,176,901 | A | 12/1979 | Ishimaru | |
| 4,349,241 | A * | 9/1982 | Juris | H01R 13/6584 |
| | | | | 439/88 |
| 2003/0157823 | A1* | 8/2003 | Morris | H01R 13/5219 |
| | | | | 439/271 |
| 2014/0335712 | A1* | 11/2014 | Semple | E21B 43/128 |
| | | | | 439/271 |

FOREIGN PATENT DOCUMENTS

| | | | |
|---|---|---|---|
| GB | 800991 | A | 9/1958 |
| GB | 800993 | A | 9/1958 |

OTHER PUBLICATIONS

International Search Report and Written Opinion of the International Searching Authority for International Application No. PCT/US2016/032789 dated Feb. 2, 2017.

* cited by examiner

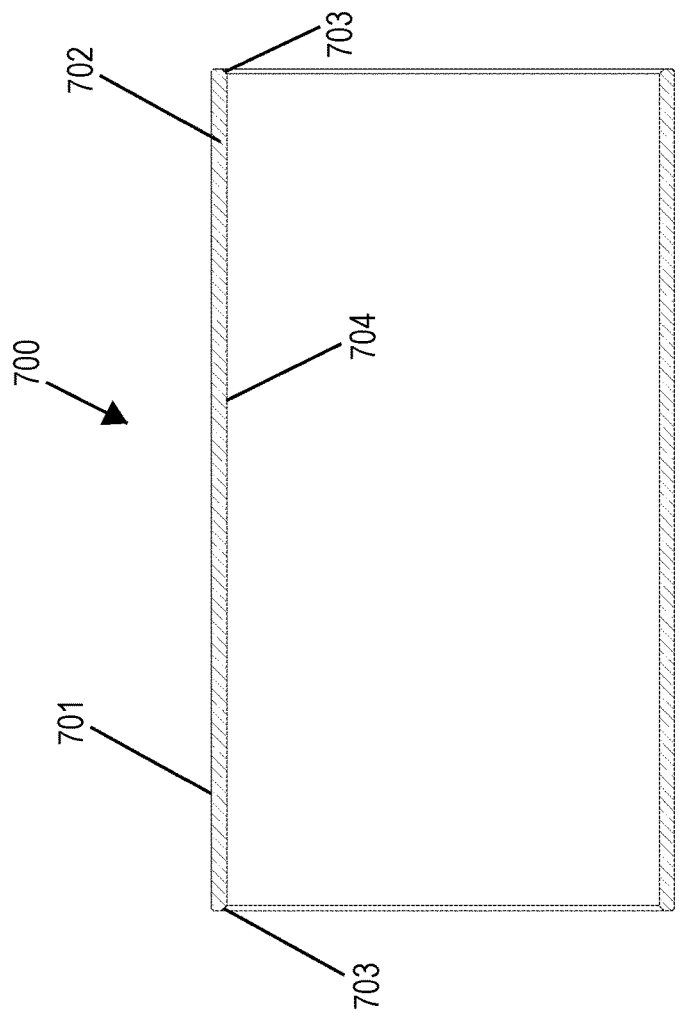
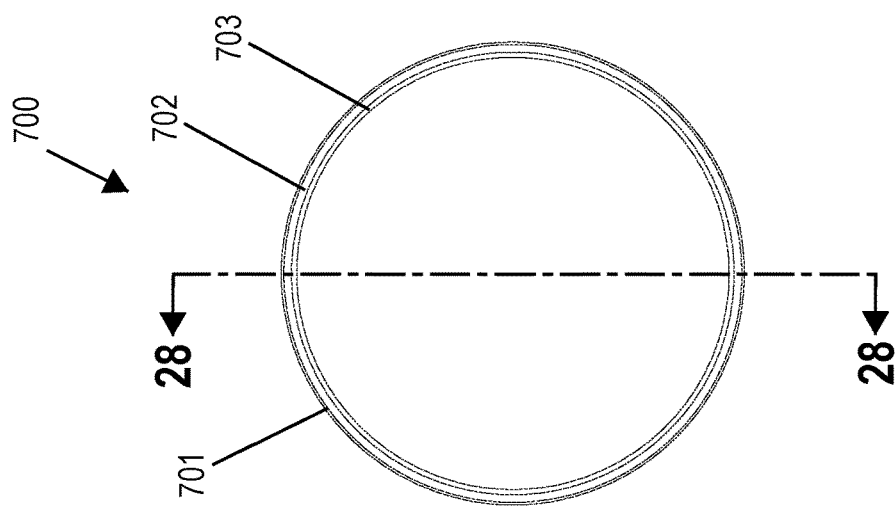

ELECTRICAL PENETRATOR ASSEMBLY

TECHNICAL FIELD

This specification generally relates to electrical penetrator assemblies and more particularly to electrical connectors for electrical penetrator assemblies.

BACKGROUND

The information described in this background section is not admitted to be prior art.

Nuclear reactors have been used for many purposes ranging from electric energy generation to medical and scientific research. The use of nuclear reactors is a highly regulated industry with global governments and industry groups advocating for best practice safety standards. Recently, standards of nuclear reactor design have been revisited to further enhance the industry. Some industry recommendations include expanding the design life of nuclear reactors from 40 year design lives to 60 year design lives to allow for the safe implementation of nuclear reactors for decades. However, due to the varying environmental conditions during the cycles experienced by nuclear reactors, the design standards must account for these changes over extended periods of time.

SUMMARY

This specification describes electrical penetrator assemblies and electrical connectors for electrical penetrator assemblies.

In one example, an apparatus configured to couple to an electrical penetration assembly comprises an inorganic body comprising an inorganic insulator and a plurality of electrical conductors. The plurality of inorganically insulated conductors is configured to transmit electrical and/or optical signals from the electrical penetration assembly through the apparatus. The apparatus further comprises a connector configured to connect to the electrical penetration assembly. The connector comprises an inorganic flange and/or housing, a plurality of sockets and/or pins, and an inorganic seal configured to seal the inorganic flange and/or housing to the electrical penetration assembly.

It is understood that the various aspects of the electrical penetrator assembly described in this specification are not limited to the example aspects summarized in this Summary.

BRIEF DESCRIPTION OF THE DRAWINGS

Various features and characteristics of an electrical penetrator assembly described in this specification may be more thoroughly understood by reference to the accompanying figures, in which:

FIG. 27 an end view of the penetrator connector body insulator sleeve shown in FIG. 26;

FIG. 28 is a cutaway view of the penetrator connector body insulator sleeve shown in FIG. 27 taken along dashed line 28;

Figure 1:
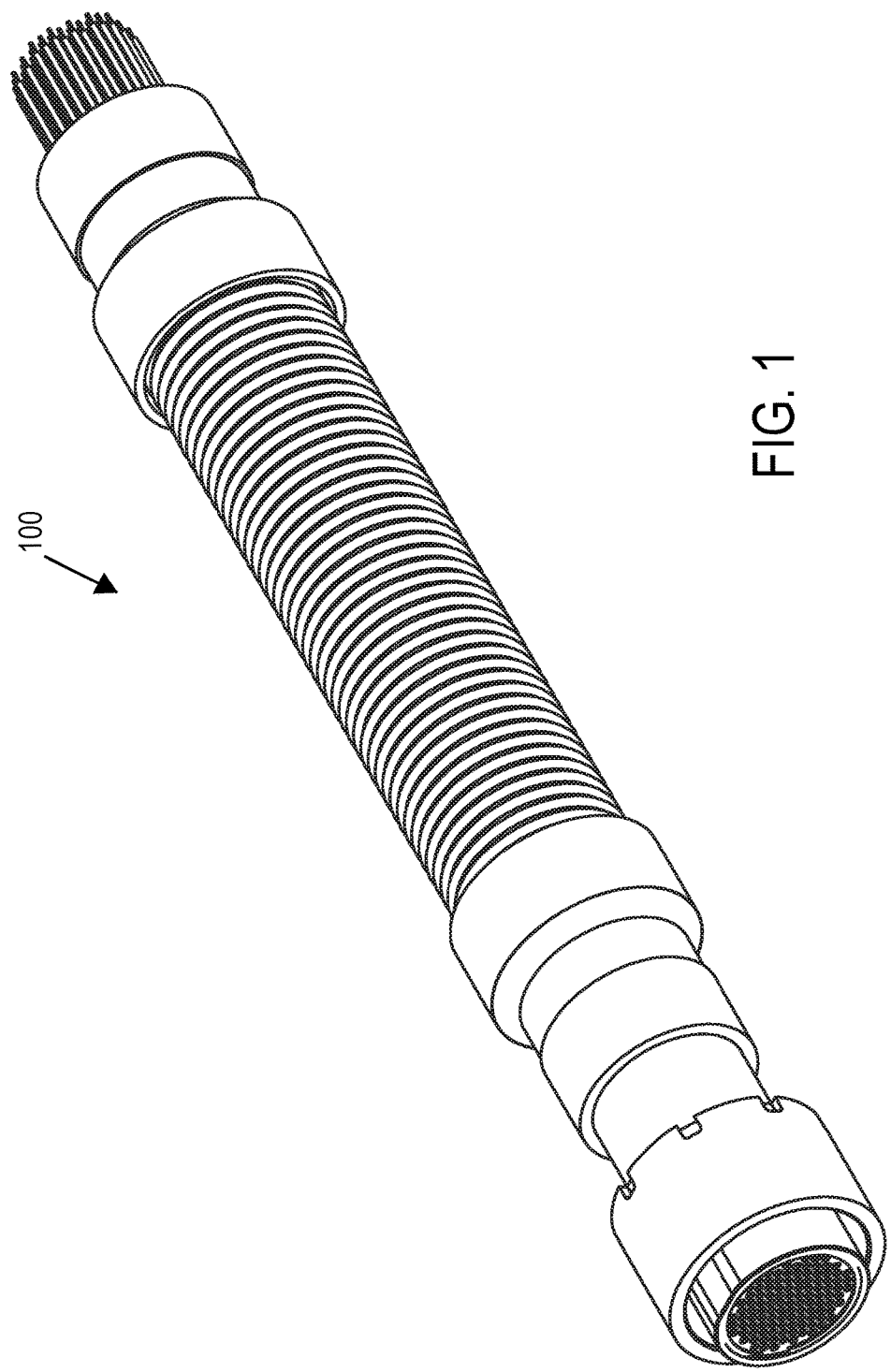
FIG. 1 is a perspective view of an electrical connector housing with flexible conduit assembly.

The reader will appreciate the foregoing features and characteristics, as well as others, upon considering the following detailed description of the electrical penetrator assembly according to this specification.

DETAILED DESCRIPTION

This specification is generally directed to electrical connectors for use with Electrical Penetration Assemblies (EPA) of a nuclear reactor and other connectors in harsh environments and on submarines. However, they are not limited to such extemporary environments.

Generally speaking, nuclear power generation requires meticulous design and planning to ensure the safe operation of the power generation system. With nuclear power generation, numerous components, systems, and containment areas are required to permit the isolation of potentially hazardous materials. For example, it is important to maintain containment barriers around the nuclear reactor core to reduce the exposure of nuclear material and nuclear radiation. In many nuclear reactor designs, large reactor core walls of up to 4' to 5' in thickness are used to provide a barrier for the nuclear radiation. With the various containment systems, it is also necessary to transmit power, control signals, receive and transmit data signals, and receive and transmit communication signals between the equipment components within the containment areas and the equipment outside of the containment areas. For additional safety reasons, wireless communications may not provide the reliability needed to provide adequate control of the nuclear power system.

Electrical penetration assemblies permit the transfer of electrical signals across the containment barriers of nuclear reactors. The electrical penetration assemblies and these associated connectors must permit the transfer of communication and power from within a containment area to outside a containment area while maintaining the integrity of the containment. In addition, in the event of unforeseen circumstances, such as environmental conditions including earthquakes, the electrical penetration assemblies and these connectors must not provide a failure point to permit the release of harmful chemicals to the environment. With this in mind, these connectors must be designed to withstand even the most strenuous conditions.

In addition to planning for various environmental and manmade disruption events to the nuclear reactor system, other factors such as general operation conditions must be considered over the design life of a nuclear reactor system. For example, many nuclear regulatory agencies and commissions are advocating and implementing a 60 plus year design life for all nuclear reactor systems. Over such a long period of time, the components of the nuclear reactor system must be able to withstand the various environmental and operating conditions. For example, the reactor components may experience nuclear radiation, temperature cycling of temperatures up to 600 F., pressure cycling up to 1,000 psi to 2,000 psi, high humidity conditions, and harsh chemicals, just to name a few. These harsh operating conditions must be taken into consideration with the design of the various components, including the electrical connectors used with the electrical penetration assemblies, to permit the safe and long-term operation of a nuclear reactor system.

While many components over the lifetime of any system may require routine maintenance and replacement, it is advantageous to have electrical connectors that can withstand the extreme conditions over the lifetime of the nuclear reactor system. With components designed for the lifetime of the nuclear reactor system, these components can allow for safer and simpler operating conditions. In addition, by not having to routinely replace or check components, the costs of maintenance and replacement of parts can be greatly reduced. Furthermore, by limiting the number of times components need to be replaced, the operation downtime of the nuclear reactor may be reduced as well as potential exposure time for maintenance personnel which provides numerous cost savings and safety benefits. Current state of the art electrical connectors use organically insulated wiring. This wiring insulation degrades over time due to the above mentioned environmental conditions. This degradation can lead to failures in the transmission of electrical power, control and instrumentation signals. The connectors described in this application do not suffer these consequences due to the use of inorganic materials.

In one embodiment, an apparatus configured to couple to an electrical penetration assembly comprises an inorganic body comprising an inorganic insulator and a plurality of electrical conductors. The plurality of inorganically insulated conductors is configured to transmit electrical and/or optical signals from the electrical penetration assembly through the apparatus. The apparatus further comprises a connector configured to connect to the electrical penetration assembly. The connector comprises an inorganic flange and/or housing, a plurality of sockets and/or pins, and an inorganic seal configured to seal the inorganic flange and/or housing to the electrical penetration assembly.

The inorganic electrical insulator can be configured to electrically insulate each electrical conductor of the plurality of electrical conductors. The electrical insulator may comprise inorganic and non-conductive materials such as alumina oxides and alternative ceramic materials. Additionally, each electrical conductor may be sheathed by an insulator sleeve to electrically insulate the electrical conductor. This may be advantageous where different electrical signals are transmitted through the conductors, such as power and communication signals.

In another embodiment, the inorganic body may comprise a flexible conduit assembly configured to permit movement of a first end of the apparatus relative to a second end of the apparatus. This may be advantageous where there is movement of the system inside with respect to outside the containment. For example, where there is thermal expansion, an earthquake or manmade disturbance, the flexibility of the flexible conduit may permit the connector to flex and maintain containment of nuclear reactor system. This flexibility is also useful during the assembly and installation of the electrical connector.

In one example, the connector may comprise a threaded connection configured to matingly receive an electrical penetration assembly and/or an apparatus. This connection provides for ease of installation and the ability to disconnect the electrical connector for maintenance or mating component replacement. The connector may also comprise a socket plate and/or pin plate comprising a plurality of apertures and wherein each aperture corresponds with one of the sockets and/or pins of the connector. In some embodiments, the number of sockets/pins can exceed 100 which may permit numerous electrical connections through a single connector. The connector may further comprise a socket and/or pin retainer plate to retain the socket plate and/or pin plate. The sockets and/or pins may comprise conductive material suitable for the specific application. The sockets and/or pins may comprise a corrosion-resistant material suitable for the specific application.

In another embodiment, the apparatus may transmit electrical signals such as power, control signals, or data signals, or any combination thereof including fiber optics. The apparatus may transmit the signals between the connector and an electrical penetration assembly. The inorganic seal comprises a metal and/or alloy, wherein an electrical penetration assembly comprises a metal and/or alloy and wherein the inorganic seal is configured to seal the connector to an electrical penetration assembly through a metal-to-metal, metal-to-alloy, and/or alternative inorganic seal materials.

Figure 2:
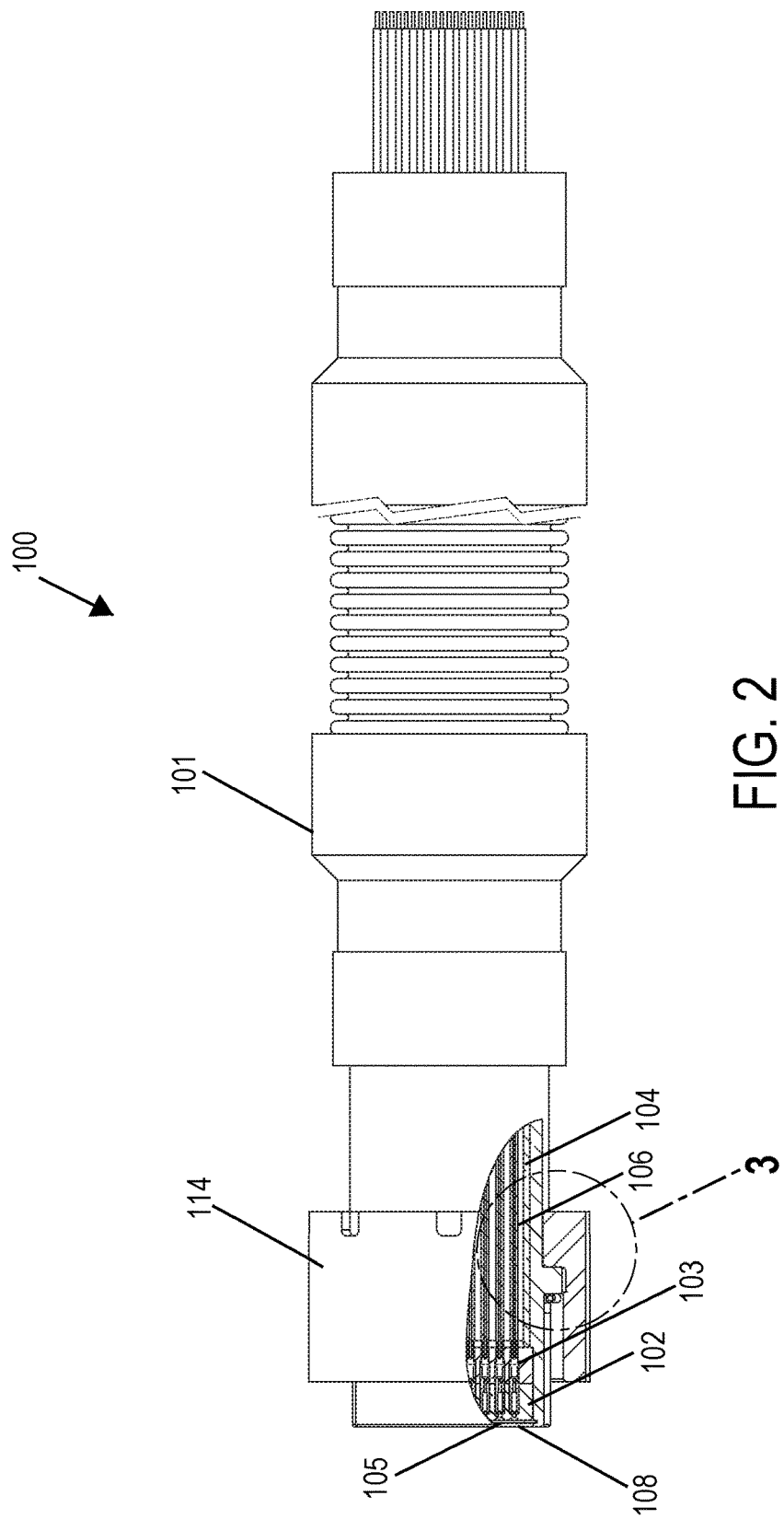
FIG. 2 is a partial cutaway view of the electrical connector housing with flexible conduit assembly shown in FIG. 1.
Figure 3:
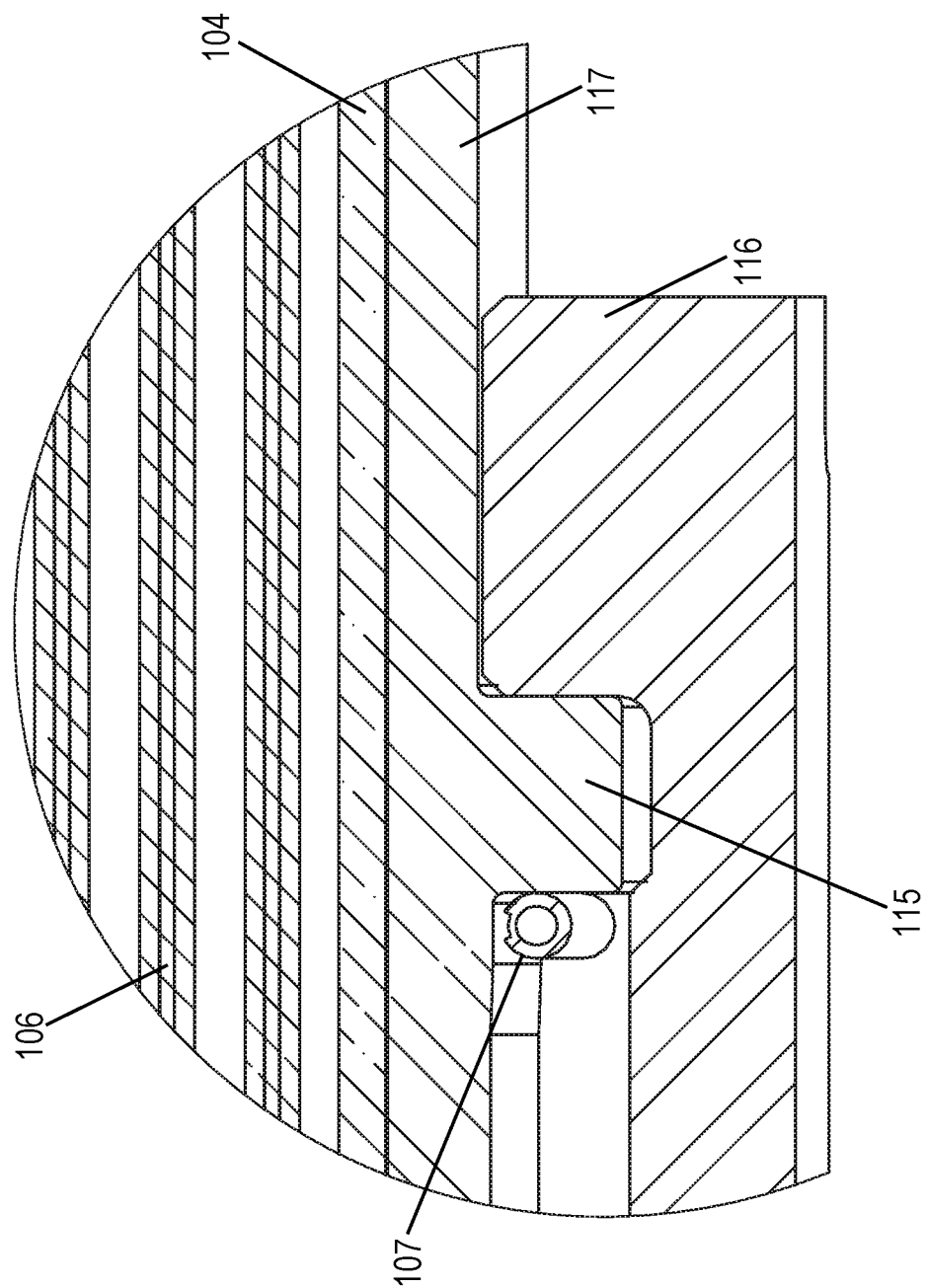
FIG. 3 is a partial view of the electrical connector housing with flexible conduit assembly shown in FIG. 2 taken along dashed circle 3.

Referring to FIGS. 1-3, an electrical connector 100 with flexible conduit assembly is shown. The electrical connector 100 comprises a connector containment side housing 101 and a connector nut 114. The connector containment side housing 101 comprises numerous components configured to permit the connector to be connected to an electrical penetration assembly and transmit electrical signals. The connector containment side housing 101 comprises a plurality of sockets 105. The sockets 105 are configured to accept a corresponding connection from an electrical penetration assembly to permit the completion of an electrical circuit to transmit electrical signals across the electrical connector. In one embodiment, the socket 105 comprises copper with gold plating. In other embodiments, other inorganic conductive materials may be chosen.

The connector containment side housing 101 comprises a connector socket retainer plate 103, a connector socket plate 102 and retaining ring 108. The retaining ring 108 is configured to retain the connector socket plate 102, and the socket retainer plate 103. The connector containment side housing 101 comprises a plurality of conductors 106. The conductors 106 may be stranded or solid. The conductors 106 must be electrically insulated from each other, such as double wrapped fiberglass conductors with a protective braided sleeve. The conductors 106 may be advantageous over other types of conductors, such as mineral insulated conductors, which require adhesive seals at each end containing organic materials. The connector containment side housing 101 comprises a connector body insulation sleeve 104 which further insulates the conductors 106 from the connector containment side housing 101. The connector body insulation sleeve 104 may be comprised of various inorganic insulative materials, such as aluminum silica.

Now referring to FIG. 3, which provides a partial view of the electrical connector 100, the conductors 106 and connector body insulation sleeve 104 are depicted. The connector containment side housing 101 comprises outer housing body 117 having flange 115. The flange 115 is configured to be engaged by a lap flange 116 of the connector nut 114. The interaction between the flange 115 of the outer housing body 117 and the lap flange 116 of the connector nut 114 permits the positioning and engagement of the electrical connector 100 with an electrical penetration assembly. As the connector nut 114 is threaded onto an electrical penetration assembly the lap flange 116 engages flange 115 and forces the flange 115 to engage and deform an inorganic sealing ring 107. The engagement of the sealing ring 107 permits the electrical connector 100 to maintingly seal with an electrical penetration assembly using a hermetic inorganic seal. The sealing ring may be made of various inorganic materials or may be a GRAFOIL ring made of inorganic materials. The use of an inorganic ring prevents the degradation associated with organic seals and rings when they are subjected to the environmental conditions associated with a nuclear reactor.

The electrical connector 100 comprises inorganic materials. Through the use of entirely inorganic materials, the electrical connector 100 may withstand various environmental conditions, such as high temperatures, high pressures, nuclear radiation, or harsh chemicals. Existing electrical connectors used in nuclear reactor containment use organic materials such as cross-linked polyethylene which can deteriorate over periods of time due to the harsh conditions experienced by the electrical connectors. When the materials deteriorate, the connectors must be replaced or repaired which causes operation downtime and a potential for a failure of the component, which could result in devastating results. Thus by utilizing entirely inorganic materials in the electrical connector 100, the design life of the electrical connector can exceed 60 years.

Figure 4:
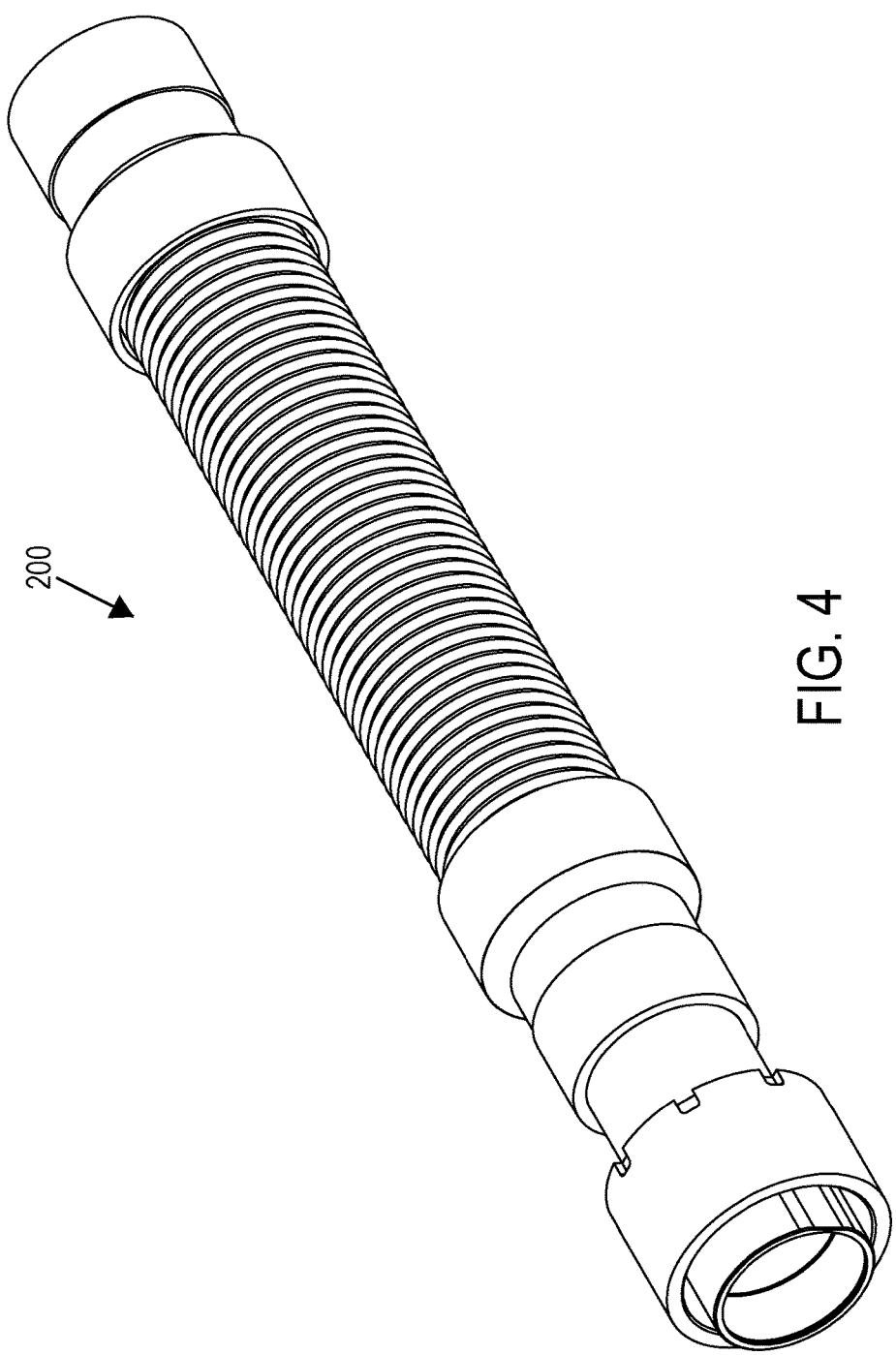
FIG. 4 is a perspective view of an electrical connector housing with flexible conduit assembly.
Figure 5:
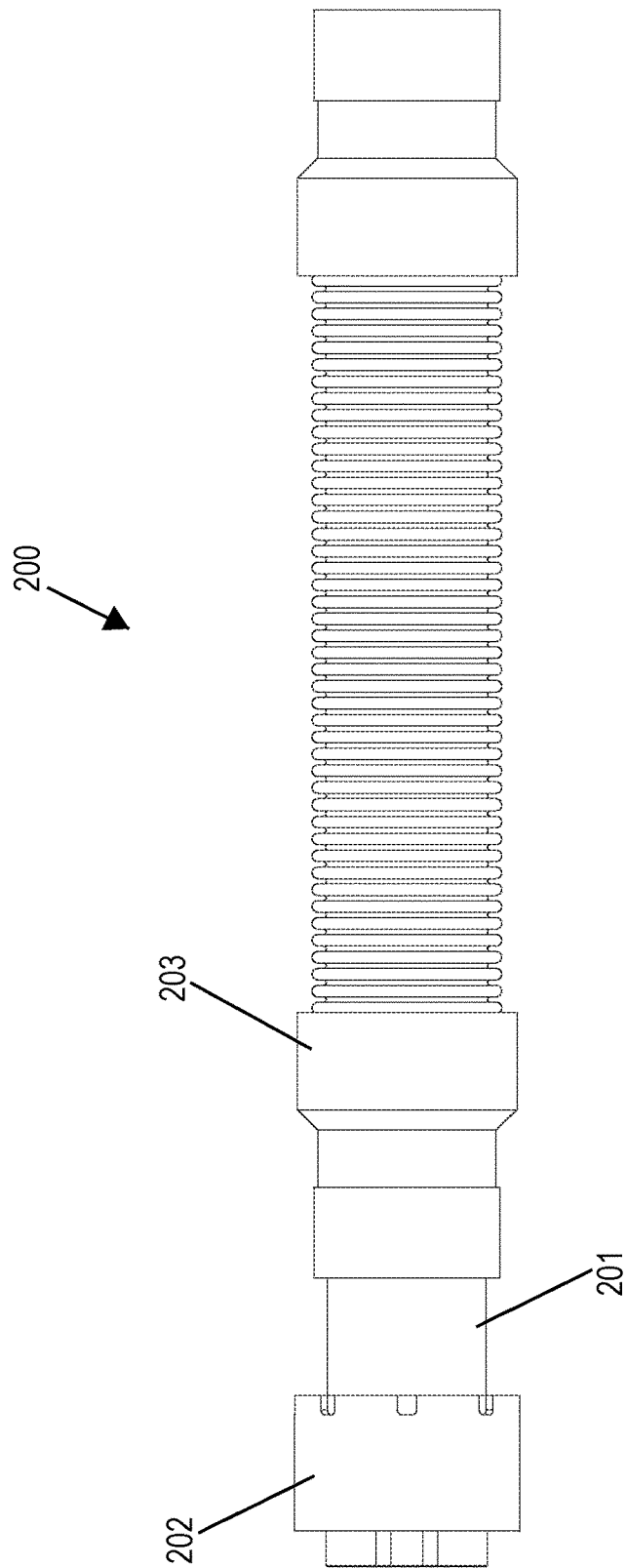
FIG. 5 is a side view of the electrical connector housing with flexible conduit assembly shown in FIG. 4.
Figure 6:
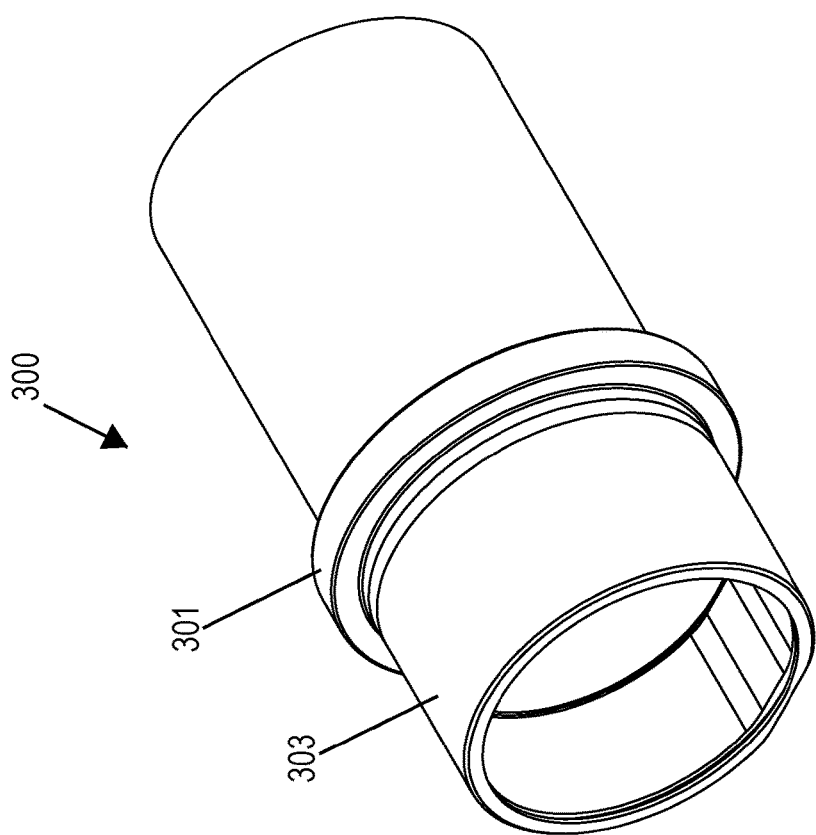
FIG. 6 is a perspective view of a penetrator connector shell.
Figure 7:
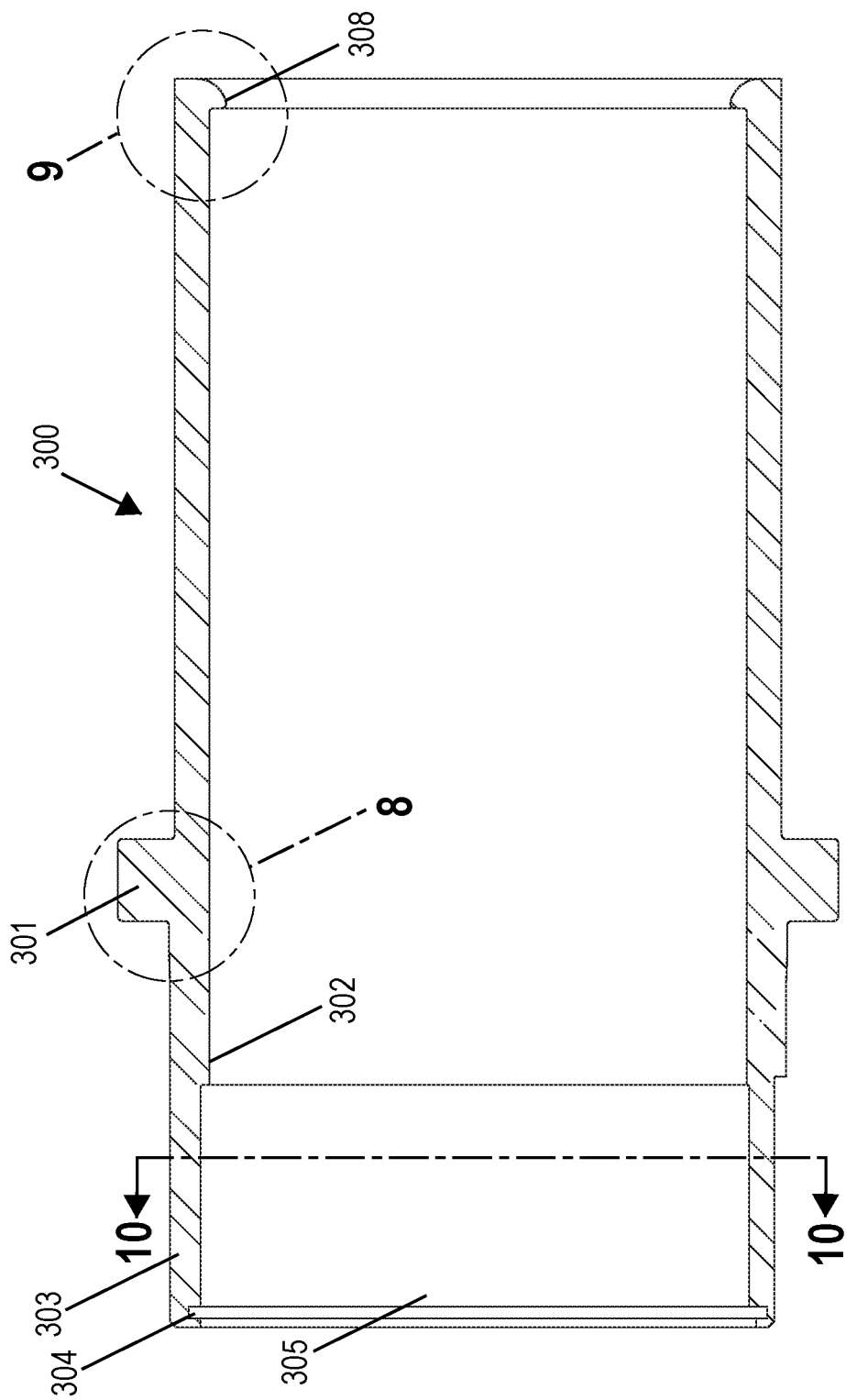
FIG. 7 is a partial cutaway view of the penetrator connector shell shown in FIG. 6.
Figure 9:
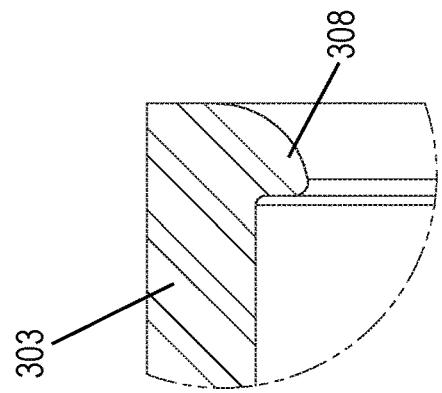
FIG. 9 is a partial view of the penetrator connector shell shown in FIG. 7 taken along dashed circle 9.
Figure 8:
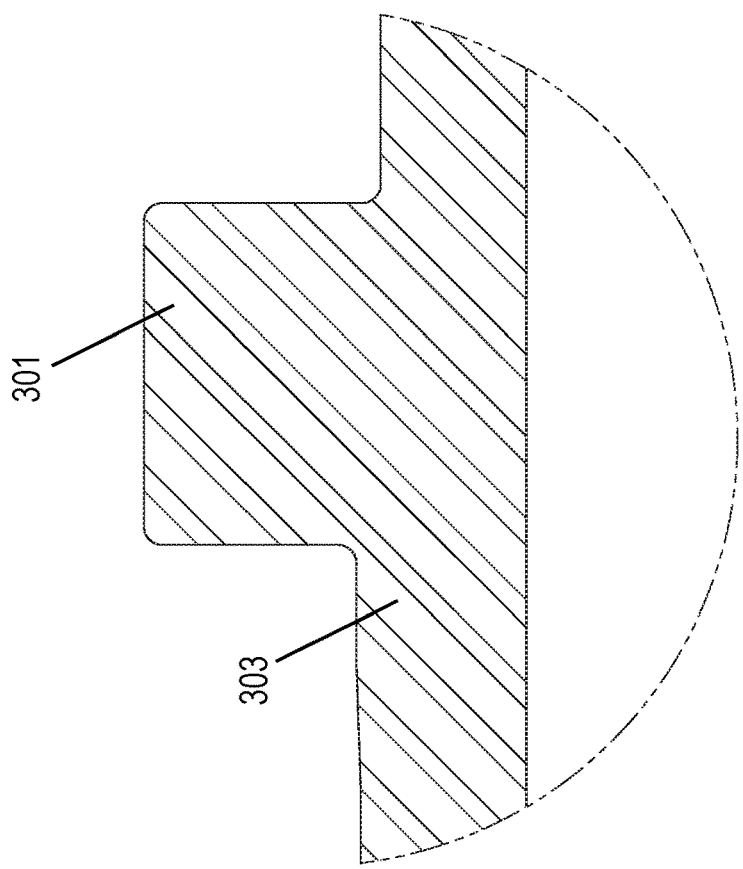
FIG. 8 is a partial view of the penetrator connector shell shown in FIG. 7 taken along dashed circle 8.
Figure 11:
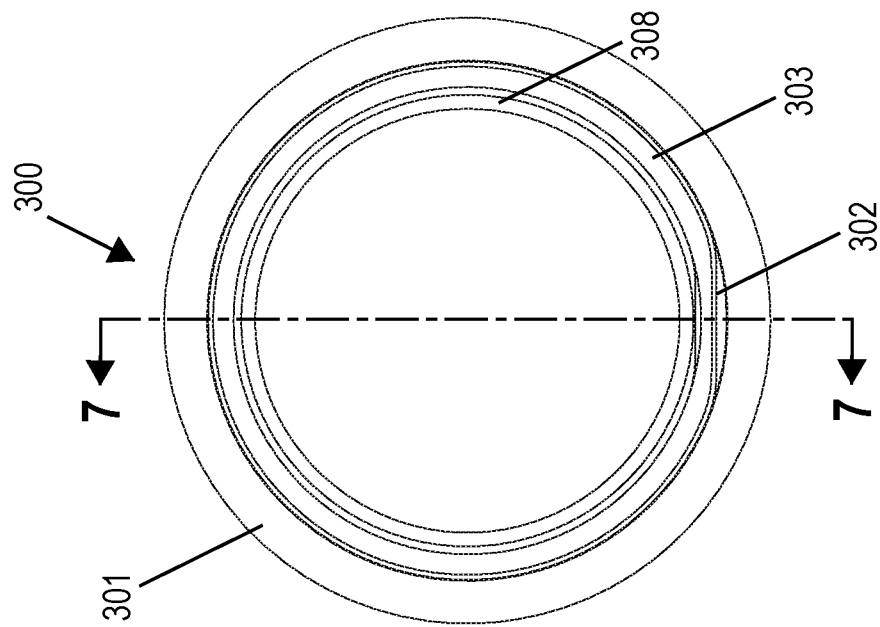
FIG. 11 an end view of the penetrator connector shell shown in FIG. 7.
Figure 10:
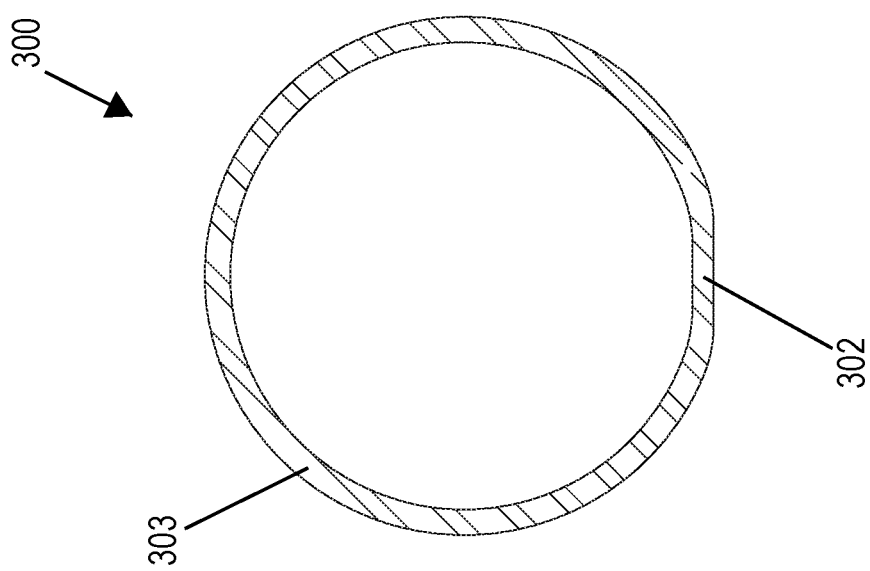
FIG. 10 is a partial cutaway view of the penetrator connector shell shown in FIG. 7 taken along line 10.
Figure 12:
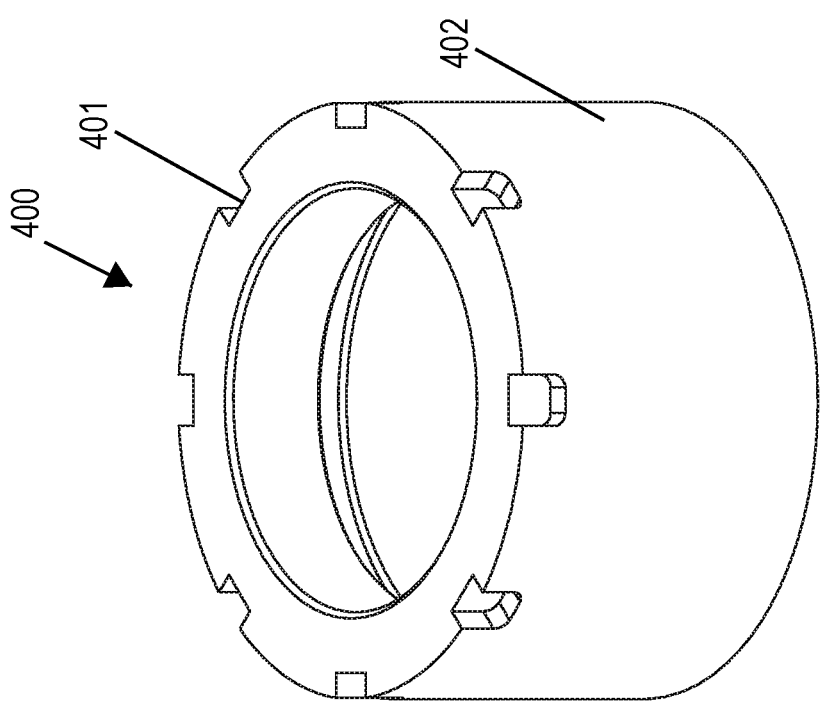
FIG. 12 a perspective view of a penetrator connector castle nut.
Figure 14:
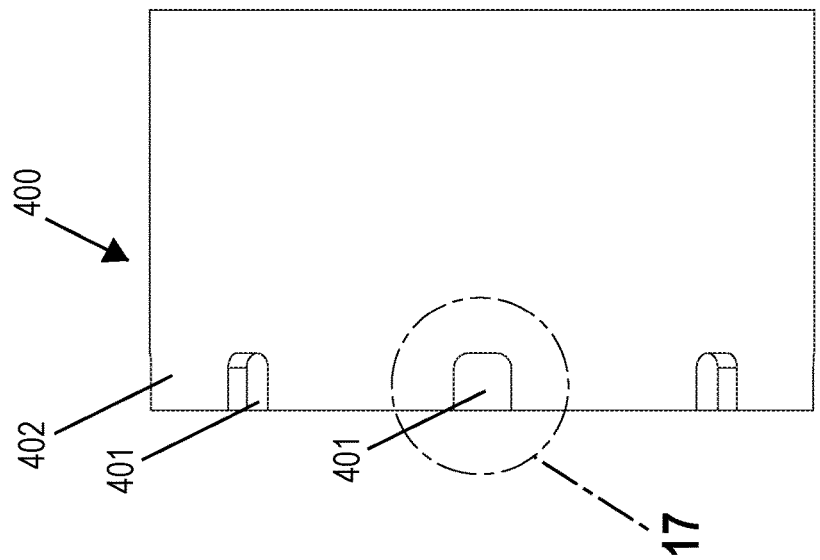
FIG. 14 is a side view of the penetrator connector castle nut shown in FIG. 12.
Figure 13:
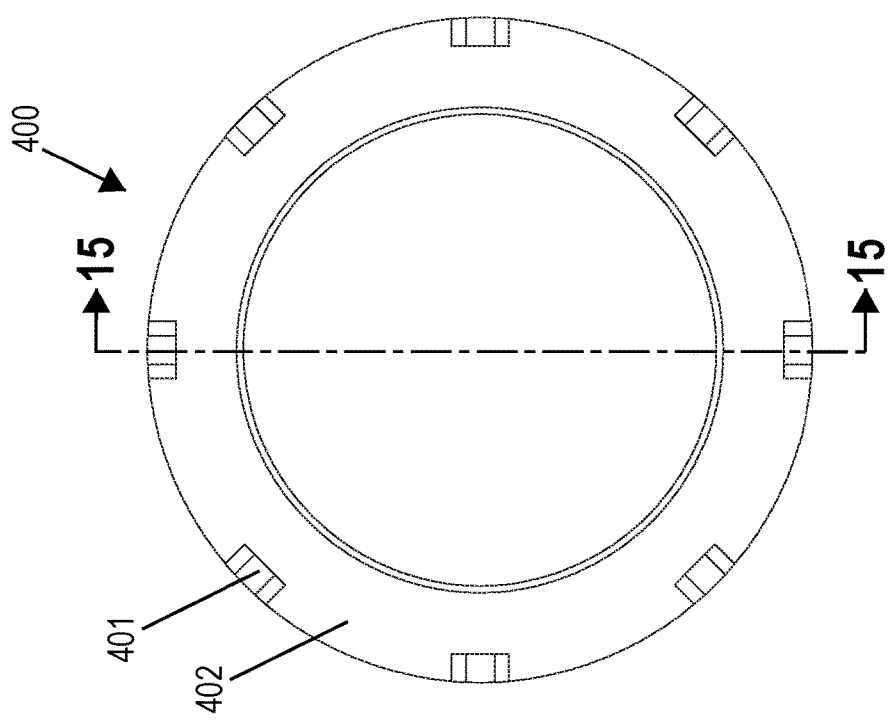
FIG. 13 is a top plant view of the penetrator connector castle nut shown in FIG. 12.

Referring to FIGS. 4-5, an electrical connector 200 is shown. The electrical connector 200 includes a modified lap flange hose assembly 203 and connector shell 201. The electrical connector 200 comprises threaded connector nut 202 configured to receive a threaded connection of an electrical penetration assembly. The components of the electrical connector are similar to those described above with respect to electrical connector 100 and comprise entirely inorganic materials.

Referring to FIGS. 6-11, a penetrator shell 300 is shown. The penetrator shell 300 comprises flange 301 and housing 303. The shape of the penetrator shell 300 permits the interaction of the penetrator shell 300 with a connector nut and allows for the desired retention and engagement characteristics between the electrical connector and the electrical penetration assembly. The penetrator shell 300 includes a radius 308 that prevents abrasion inside the electrical connector. The penetrator shell 300 includes various interior diameters which house various components of the electrical connector. The penetrator shell 300 includes retaining ring groove 304 configured to hold the retaining plate in a desired position. The penetrator shell 300 comprises inner cavity 305 having a diameter. The diameter of the inner cavity 305 permits the engagement and precision fit of the connector socket plate. The penetrator shell 300 includes interior wall 302 that provides a surface for the positioning and restraint of the connector socket plate.

The penetrator shell 300 comprises alignment portion 302 which includes a flat section. This flat section which varies from the symmetrical circumference of the housing 303 assists with the proper alignment of the penetrator shell 300 with an electrical penetration assembly during assembly of the components. As seen in at least FIGS. 7 and 11, the penetrator shell 300 uses different inner diameters and ridges to secure the various internal components. Through the use of various internal diameters, the interior components can be positioned and the positions maintained over the life of the electrical connector without further mechanical apparatuses. Accordingly, the design provides for a simpler and more robust design.

Figure 15:
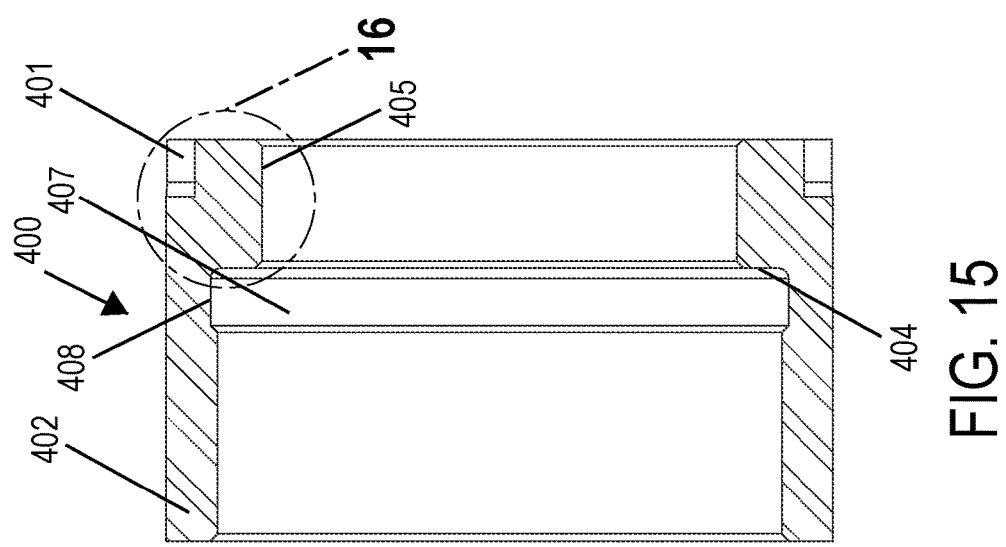
FIG. 15 is a partial cutaway view of the penetrator connector castle nut shown in FIG. 12 taken along line 15.
Figure 17:
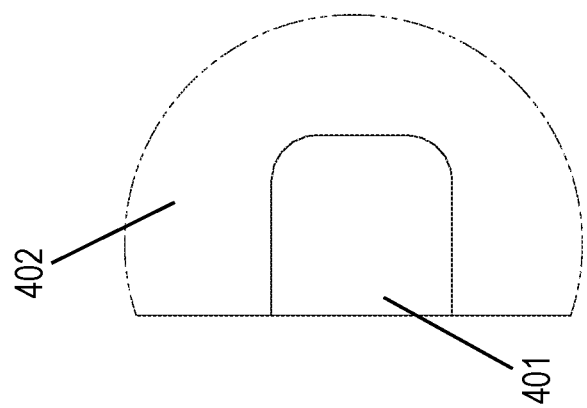
FIG. 17 is a partial view of the penetrator connector castle nut shown in FIG. 14 taken along dashed circle 17.
Figure 16:
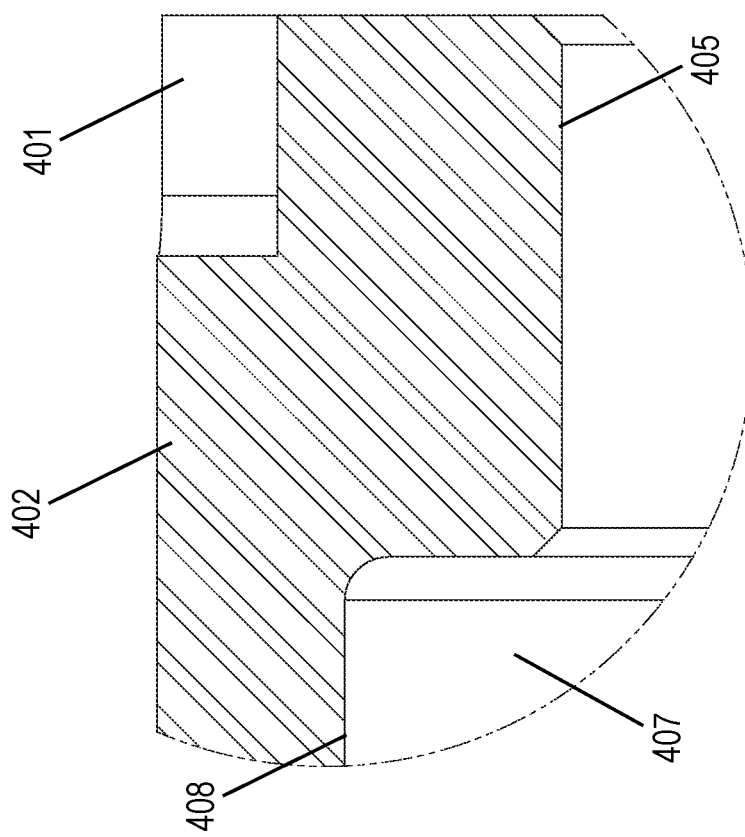
FIG. 16 is a partial view of the penetrator connector castle nut shown in FIG. 15 taken along dashed circle 16.
Figure 18:
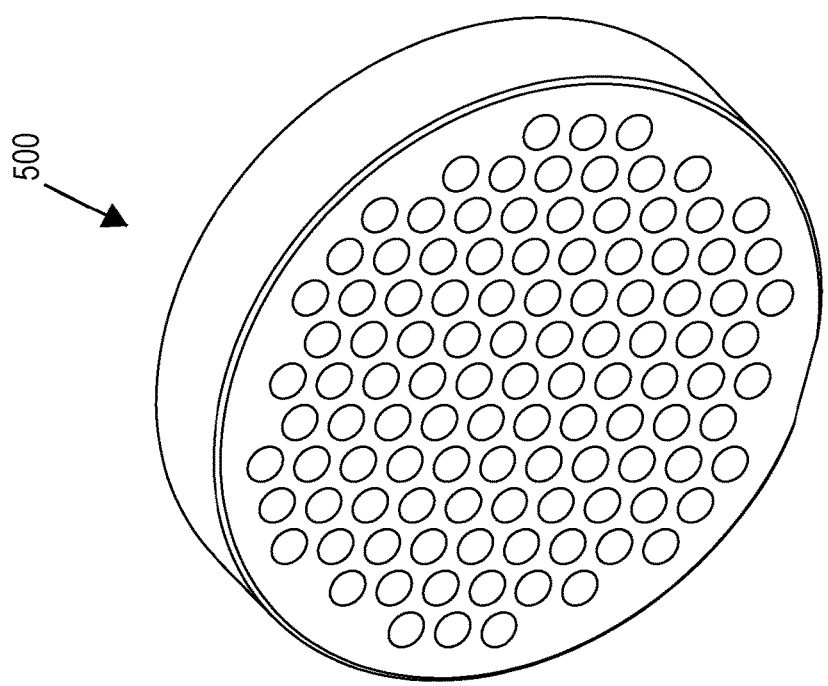
FIG. 18 is a perspective view of a penetrator socket plate.
Figure 19:
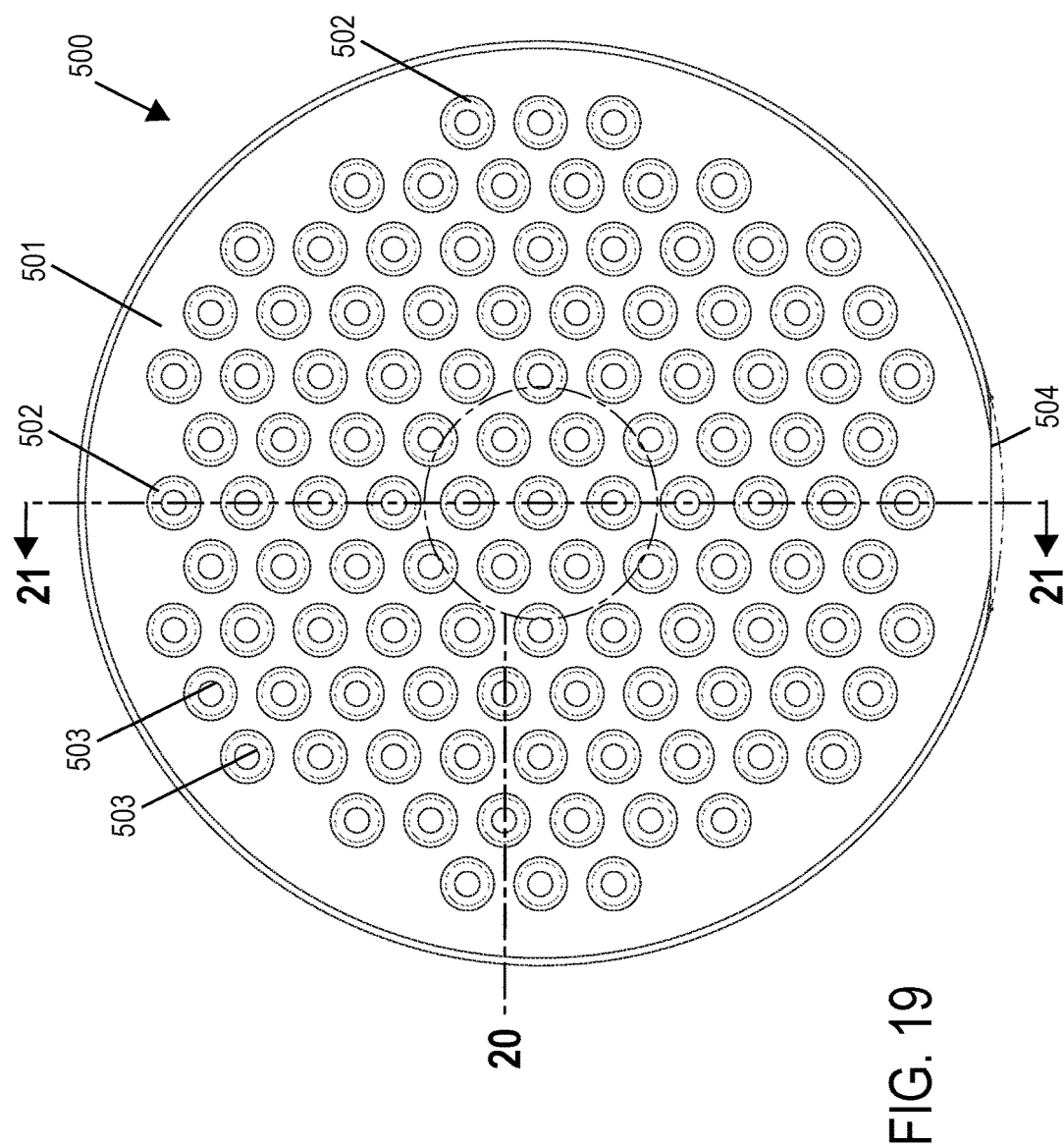
FIG. 19 is a plan view of the penetrator socket plate shown in FIG. 18.
Figure 21:
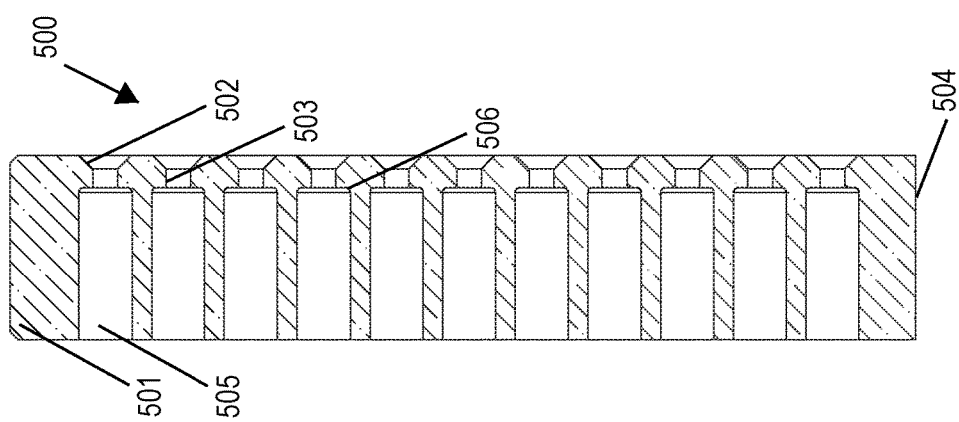
FIG. 21 is a cutaway view of the penetrator socket plate shown in FIG. 19 taken along dashed line 21.
Figure 20:
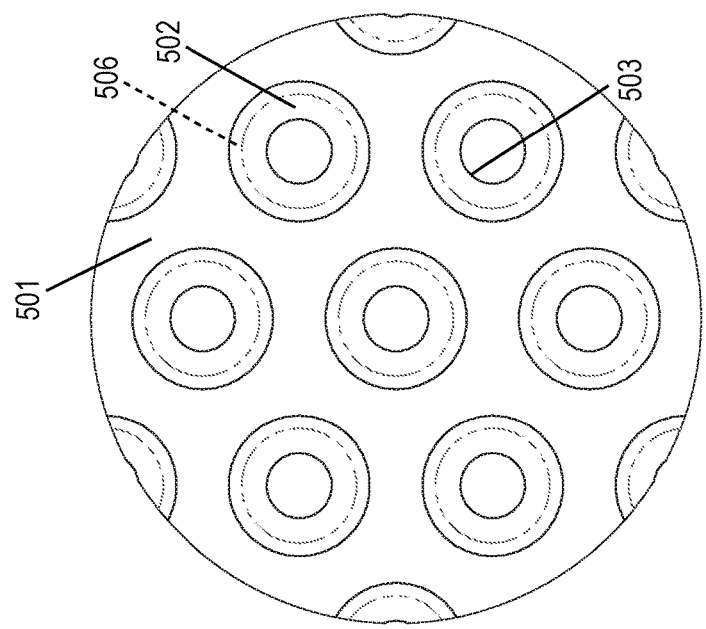
FIG. 20 is a partial view of the penetrator socket plate shown in FIG. 19 taken along dashed circle 20.
Figure 22:
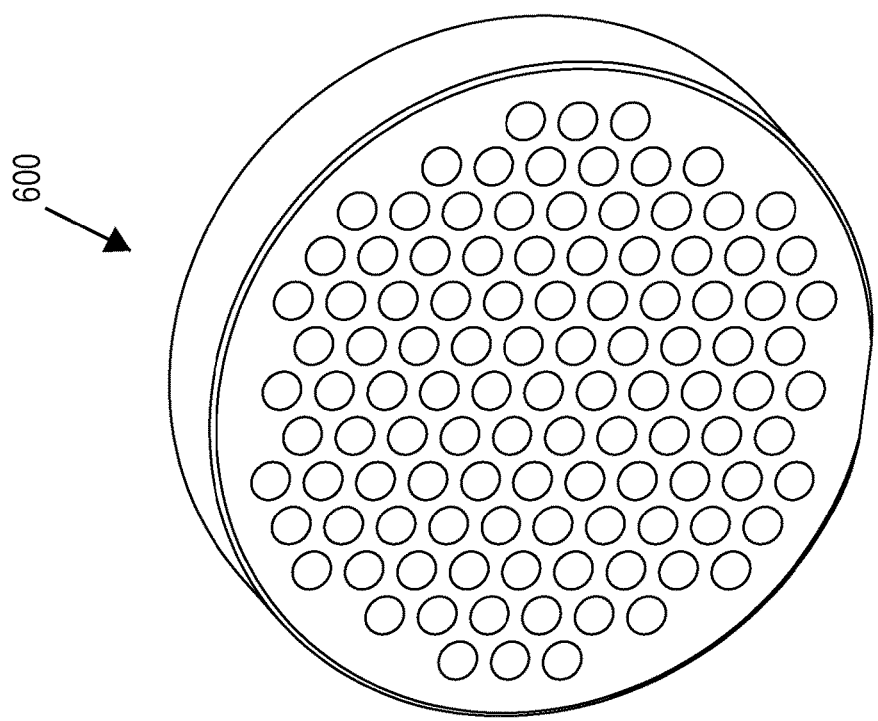
FIG. 22 is a perspective view of a penetrator socket retainer plate.
Figure 23:
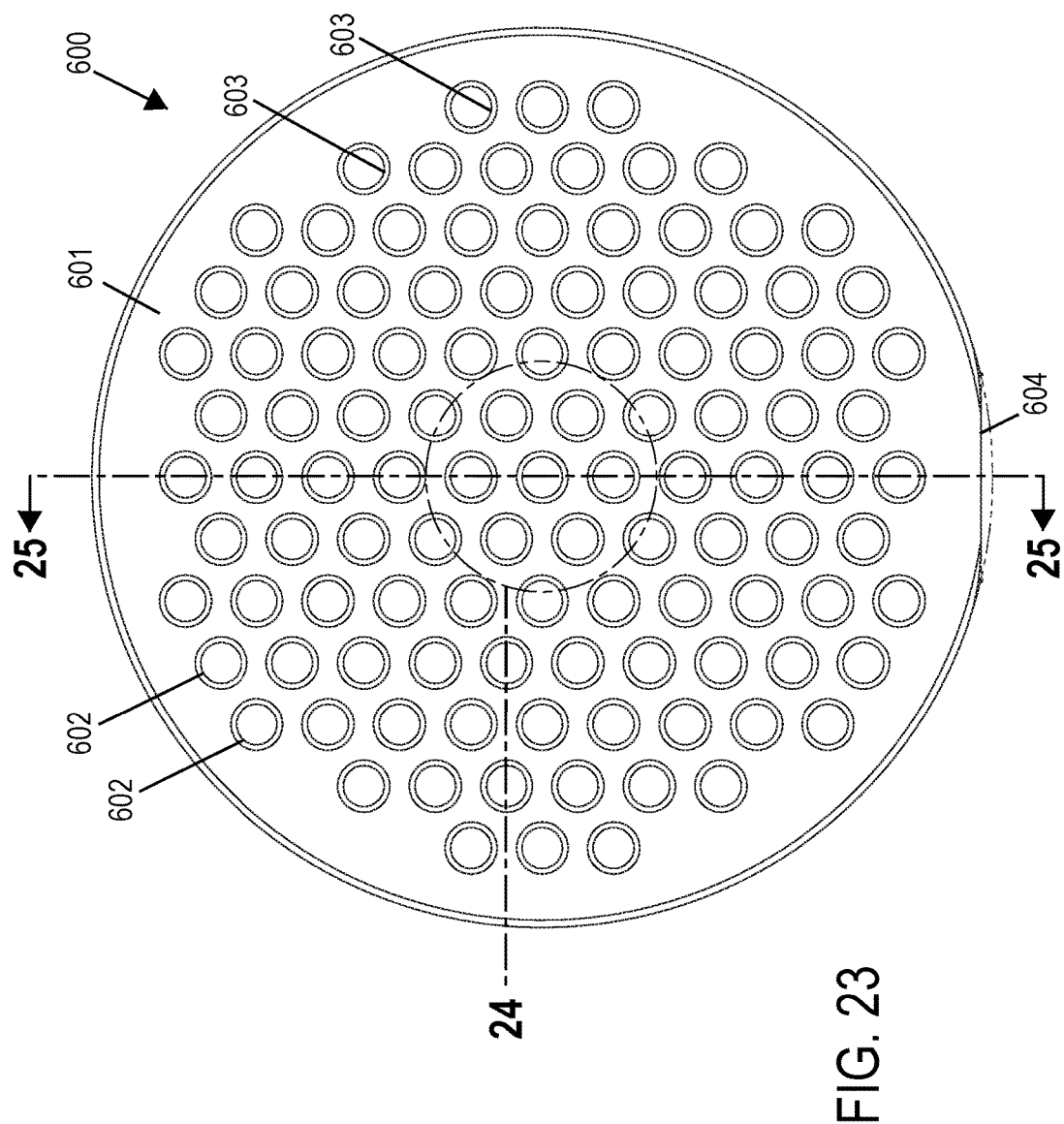
FIG. 23 is a plan view of the penetrator socket retainer plate shown in FIG. 22.
Figure 25:
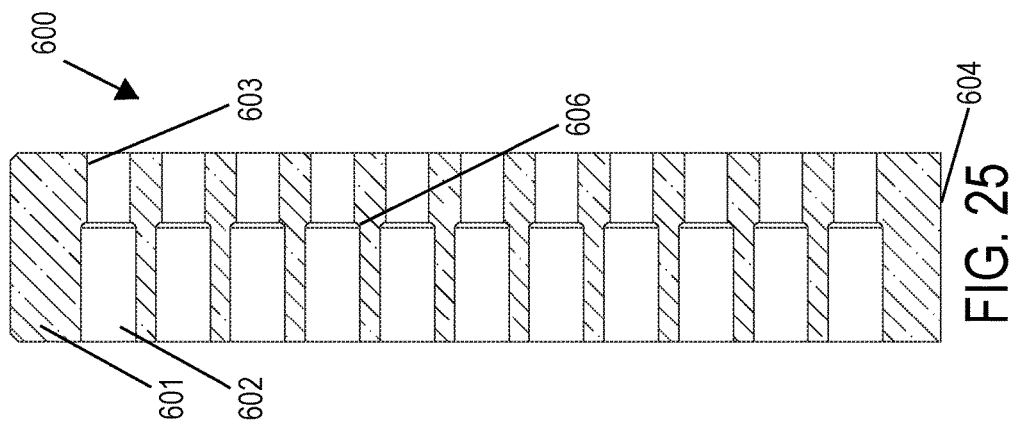
FIG. 25 is a cutaway view of the penetrator socket retainer plate shown in FIG. 23 taken along dashed line 25.
Figure 24:
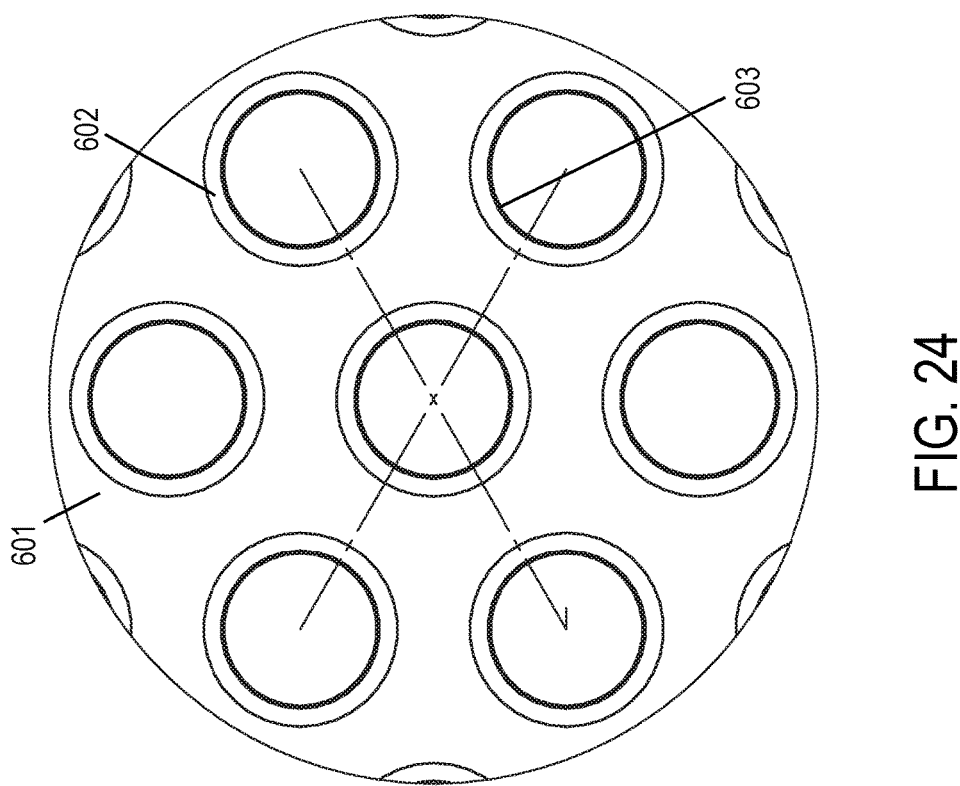
FIG. 24 is a partial view of the penetrator socket retainer plate shown in FIG. 23 taken along dashed circle 24.

Referring to FIGS. 12-17, a connector nut 400 is shown. The connector nut 400 comprises an outer surface 402 and a plurality of grooves or indents 401. The grooves or indents 401 permit a tool to tighten the connector nut 400 in place. With the inorganic seal, a higher torque is typically required for a seal in comparison to an organic gasket. The indents are 401 provided such that the assembly tool may engage the connector nut 400 to provide the necessary torque. As seen in FIG. 15, the connector nut 400 comprises a lap flange 405 that is configured to engage the sealing feature 407 of a mating penetrator shell. The connector nut 400 includes a relief feature 408 which provides thread relief and a clearance for the inorganic seal. The lap flange 405 includes surface 404 which engage the sealing feature 407 of the penetrator shell. Surface 404 interfaces with the outer surface of the connector body shell, maintaining the positioning of the electrical connector.

Referring to FIGS. 18-21, a penetrator socket plate 500 is shown. The penetrator socket plate 500 comprises surface 501 including a plurality of sockets 502. The sockets 502 include a beveled reduction and a reduced inner diameter 503. The overall shape of the sockets 502 is complimentary to a plurality of pins of an electrical penetration assembly to permit conductivity across the connection. The penetrator socket plate 500 further includes a flat surface 504 on its outer perimeter. The flat surface 504 assists with the alignment of the penetrator socket plate 500 with a connector body shell. The penetrator socket comprises entirely inorganic material, for example aluminum oxides.

Referring to FIGS. 22-25, a penetrator socket retainer plate 600 is shown. The penetrator socket retainer plate 600 is configured to retain the penetrator socket plate 500. The penetrator socket retainer plate 600 comprises a flat surface 604 that corresponds and is complimentary to flat surface 504 of the penetrator socket plate 500. The flat surface 604 aides with proper alignment of the penetrator socket retainer plate 600 with the penetrator socket plate 500. The penetrator socket retainer plate 600 includes surface 601 having sockets 602. The sockets 602 include a reduced diameter 603 that allows for the complimentary fit of pins of an electrical penetration assembly. The penetrator socket comprises entirely inorganic material, for example aluminum oxides.

Figure 26:
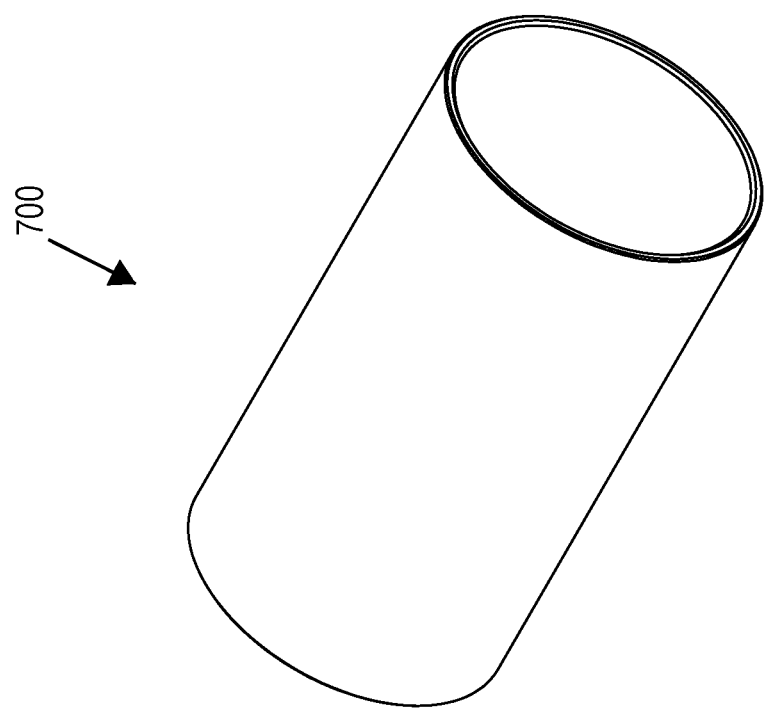
FIG. 26 is a perspective view of a penetrator connector body insulator sleeve.

Referring to FIGS. 26-28, a connector body insulator sleeve 700 is shown. The connector body insulator sleeve 700 is configured to insulate the connector body of an electrical connector from the various conductors within the electrical connector. The connector body insulator sleeve 700 comprises inorganic material, for example aluminum oxides. The connector body insulator sleeve 700 comprises outer surface 701, insulative material 702 and an inner surface 704. The connector body insulator sleeve 700 includes a beveled edge 703 on both ends to prevent abrasion of the electrical conductors.

Figure 29:
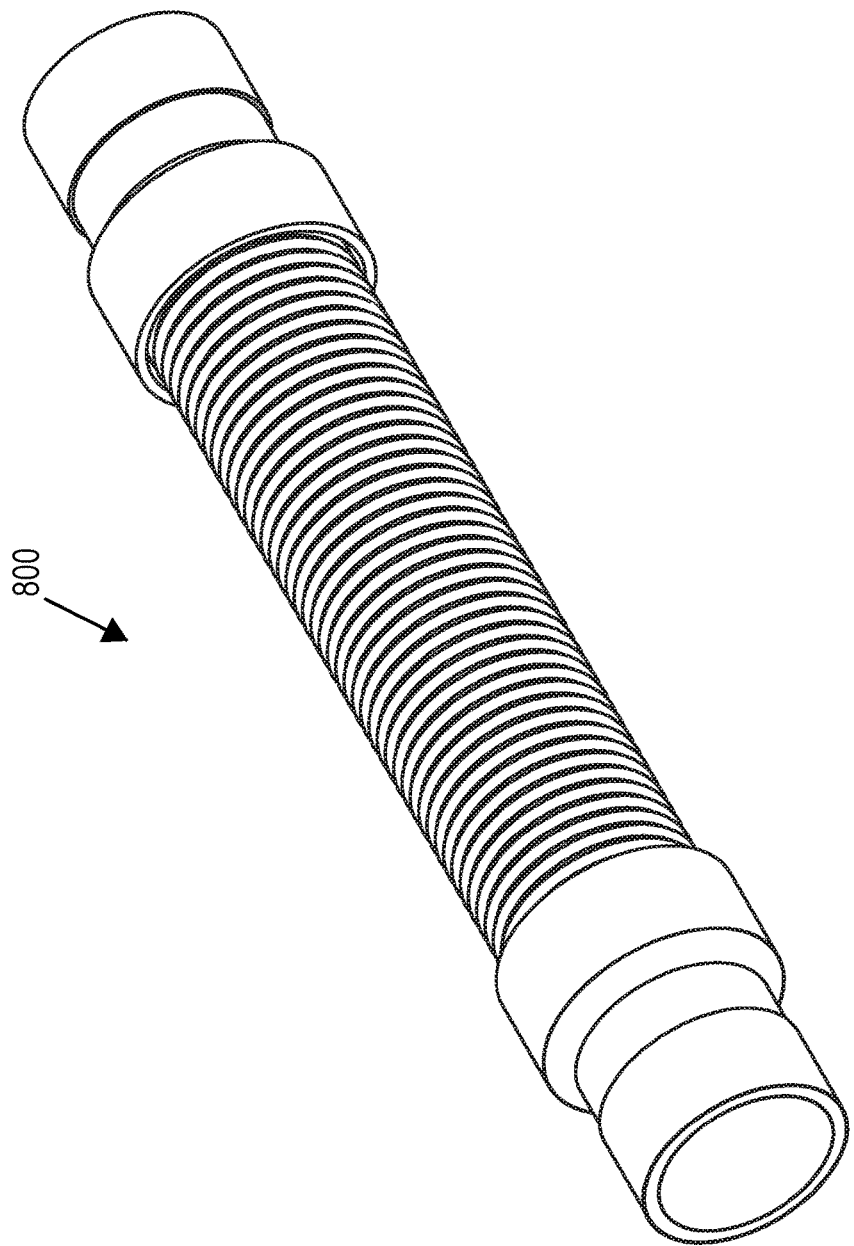
FIG. 29 is a perspective view of a penetrator flexible conduit.
Figure 30:
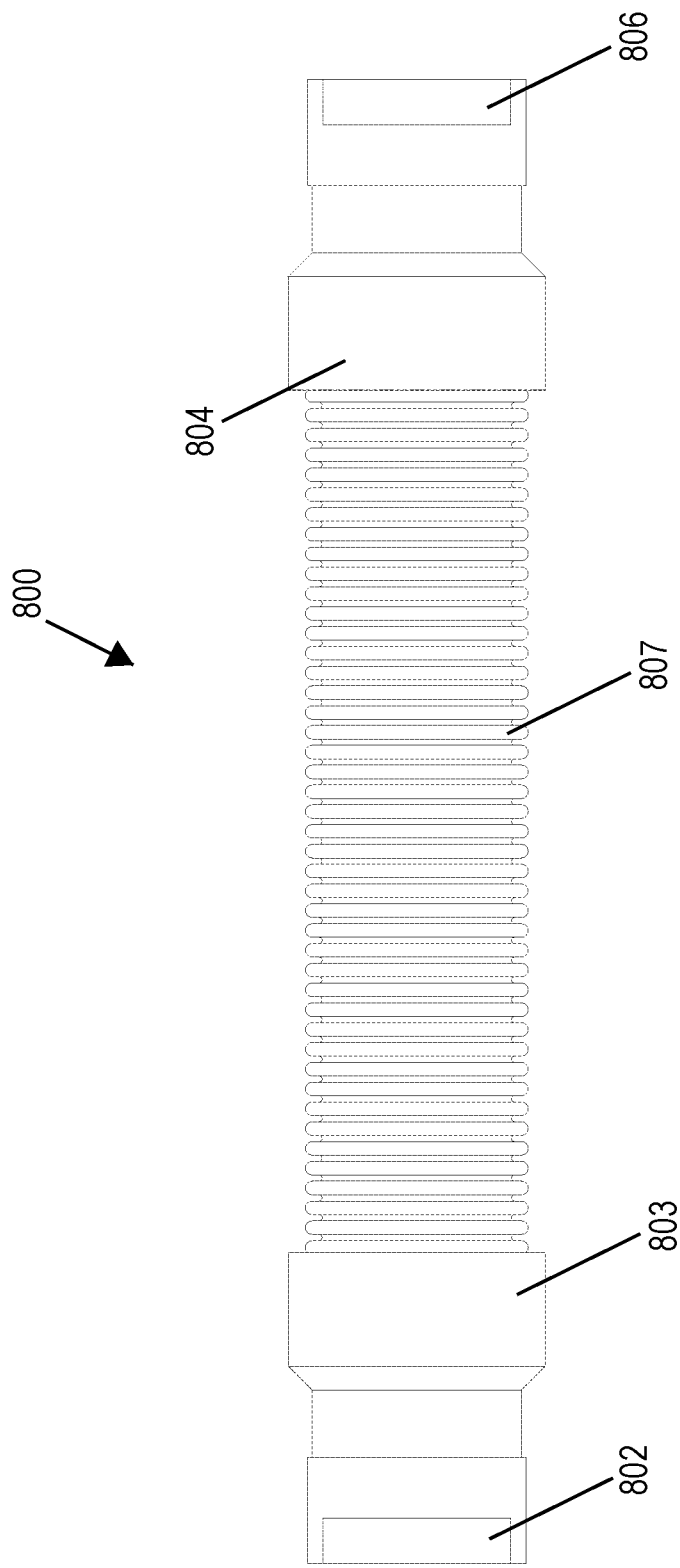
FIG. 30 is a side plan view of the penetrator flexible conduit shown in FIG. 29.

Referring to FIGS. 29-30, an electrical connector 800 with flexible conduit assembly is shown. The electrical connector 800 comprises hose ends 803 and 804 having reduced inner diameters 802, 806. The electrical connector 800 comprises inorganic material, for example AISI 316 grade stainless steel. The electrical connector 800 comprises flexible hose 807. The flexible hose 807 is made of inorganic materials and permits movement of a first end of the electrical connector 800 to move relative to the second end of the electrical connector 800. The internal diameter of the electrical connector 800 may range from ½" up to 4", depending on the desired number of conductors/pins and the size of the electrical penetration assembly. For example, the internal diameter of the electrical connector 800 may be ½", 1", 1½", 2", 2½", 3", 3½", or 4". The design of the inorganic electrical connector permits a more condensed electrical connector which allows for a greater number of conductors in a smaller diameter electrical connector. The entirely inorganic design of the electrical connecter 800 allows for the electrical connector 800 to withstand the harsh design conditions and maintain a design life of over 60 years.

Various features and characteristics of the electrical penetrator assembly are described in this specification and illustrated in the drawings to provide an overall understanding of the disclosed apparatus. It is understood that the various features and characteristics described in this specification and illustrated in the drawings can be combined in any suitable manner regardless of whether such features and characteristics are expressly described or illustrated in combination in this specification. The Inventors and the Applicant expressly intend such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements (e.g., 35 U.S.C. § 112(a) and Article 123(2) EPC). The systems and methods described in this specification can comprise, consist of, or consist essentially of the various features and characteristics described in this specification.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. An apparatus configured to couple to an electrical penetration assembly, the apparatus comprising:
    an inorganic body comprising an outer housing body;
    a plurality of electrical conductors disposed within the inorganic body and configured to transmit electrical and/or optical signals from the electrical penetration assembly through the apparatus;
    an inorganic electrical insulator sleeve disposed between the inorganic body and the plurality of electrical conductors, and configured to insulate the inorganic body from the plurality of electrical conductors;
    an inorganic flange disposed on the inorganic body;
    a plurality of sockets and/or pins operatively coupled to the plurality of electrical conductors and configured to transmit an electrical and/or optical signal between the electrical conductors and the electrical penetration assembly; and
    an inorganic sealing ring disposed in communication with the inorganic flange and configured to deform and seal the inorganic flange and/or outer housing body to the electrical penetration assembly.

2. The apparatus of claim 1, wherein the inorganic sealing ring comprises a metal and/or alloy suitable for the specific application.

3. The apparatus of claim 1, wherein each electrical conductor is sheathed by an insulator sleeve with a protective braided shield.

4. The apparatus of claim 1, wherein the inorganic body comprises a flexible conduit assembly configured to permit movement of a first end of the apparatus relative to a second end of the apparatus.

5. The apparatus of claim 1, wherein the apparatus further comprises a threaded connector nut comprising a lap flange configured to engage the inorganic flange, the connector nut having a relief feature configured to provide thread relief and clearance for the inorganic flange and/or inorganic sealing ring.

6. The apparatus of claim 1, wherein the transmitted electrical signals comprise power, control signals, or data signals, or any combination thereof including fiber optics.

7. The apparatus of claim 1, wherein the inorganic sealing ring comprises a metal and/or alloy, wherein the electrical penetration assembly comprises a metal and/or alloy and wherein the inorganic sealing ring is configured to seal the apparatus to the electrical penetration assembly through a metal-to-metal, metal-to-alloy, alloy-to-alloy seal and/or alternative inorganic seal materials.

8. The apparatus of claim 2, wherein the inorganic electrical insulator sleeve comprises alumina silica.

9. The apparatus of claim 1, wherein the apparatus is configured to operate at temperatures up to 600 F.

10. The apparatus of claim 1, wherein the apparatus is configured to operate at pressures up to 2,000 psi of external pressure.

11. The apparatus of claim 1, wherein the apparatus comprises entirely inorganic materials.

12. The apparatus of claim 1, wherein the inorganic electrical insulator sleeve comprises:
a first end;
a second end; and
a single bore extending from the first end to the second end, wherein the plurality of electrical conductors are disposed within the single bore.

13. The apparatus of claim 1, wherein the apparatus comprises a socket and/or pin plate comprising a plurality of apertures and wherein each aperture corresponds with one of the plurality of sockets and/or pins.

14. The apparatus of claim 13, wherein the apparatus comprises a socket and/or pin retainer plate to retain the socket and/or pin plate.

15. The apparatus of claim 1, wherein each of the plurality of sockets and/or pins comprises conductive material suitable for the specific application.

16. The apparatus of claim 15, wherein each of the plurality of sockets and/or pins comprises a corrosion-resistant material suitable for the specific application.

* * * * *